Jan. 26, 1954
H. MACH
2,667,288
FLEXIBLE WALLED MEASURING POCKET WITH INLET AND OUTLET CUTOFFS
Filed Sept. 8, 1949
2 Sheets-Sheet 1
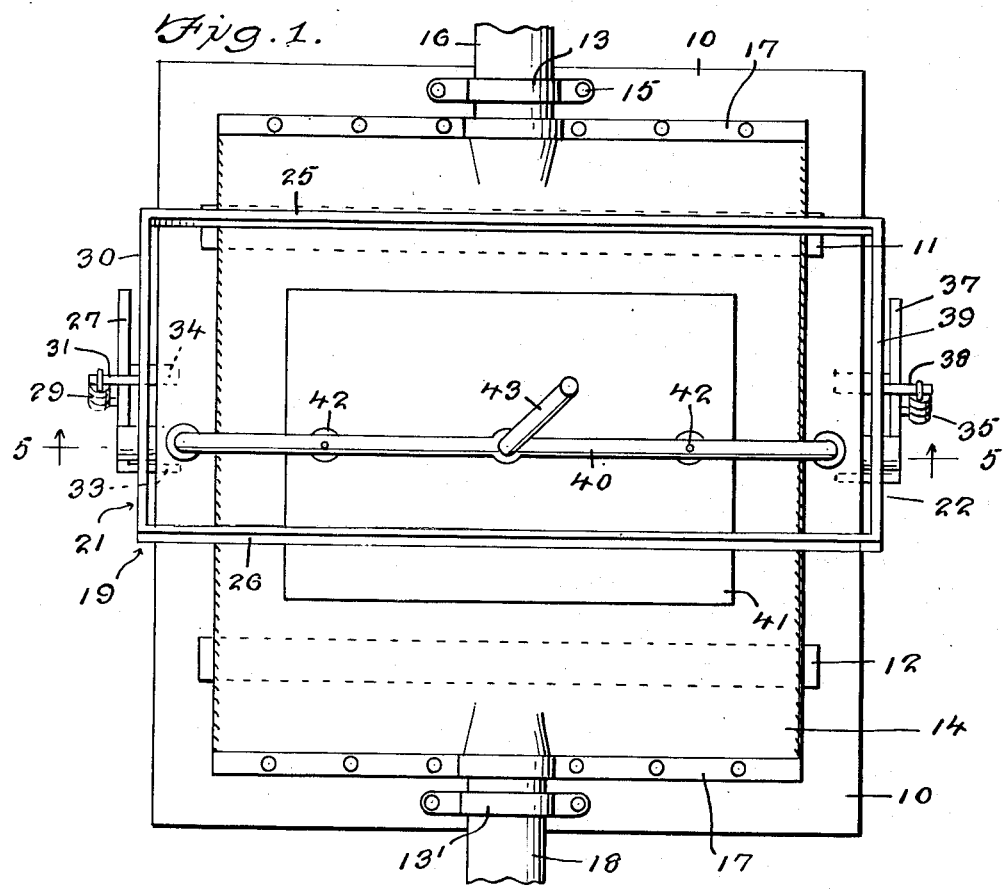
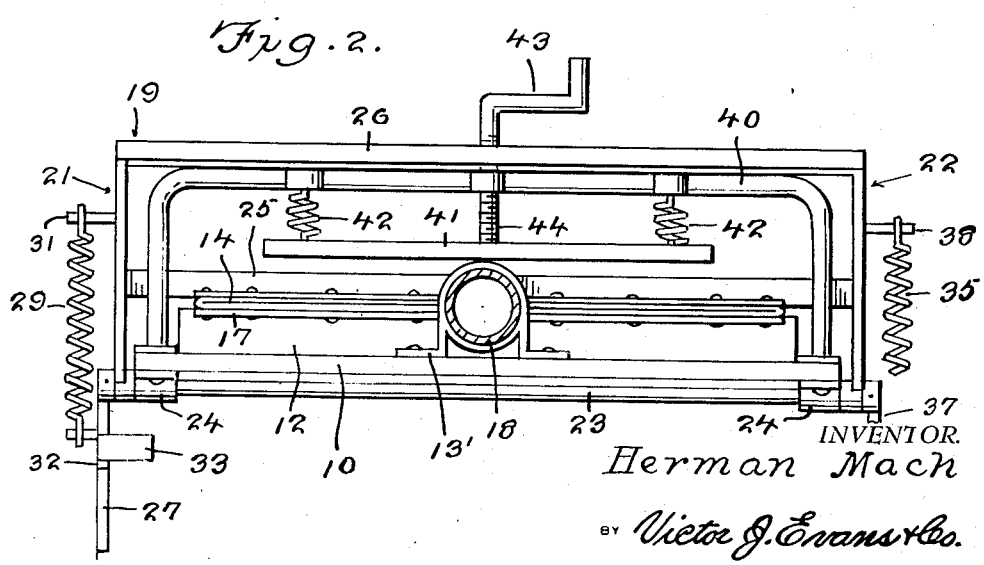
INVENTOR.
Herman Mach
BY Victor J. Evans & Co.
ATTORNEYS

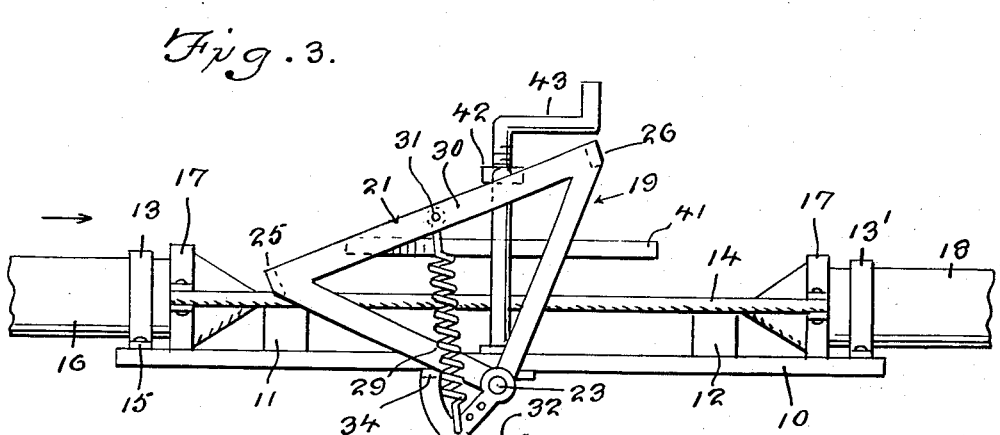
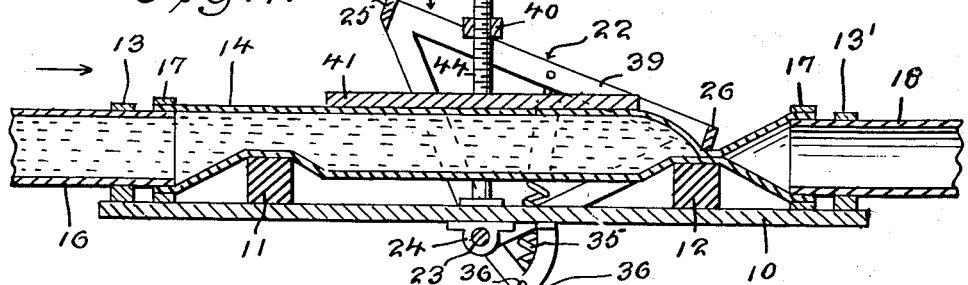
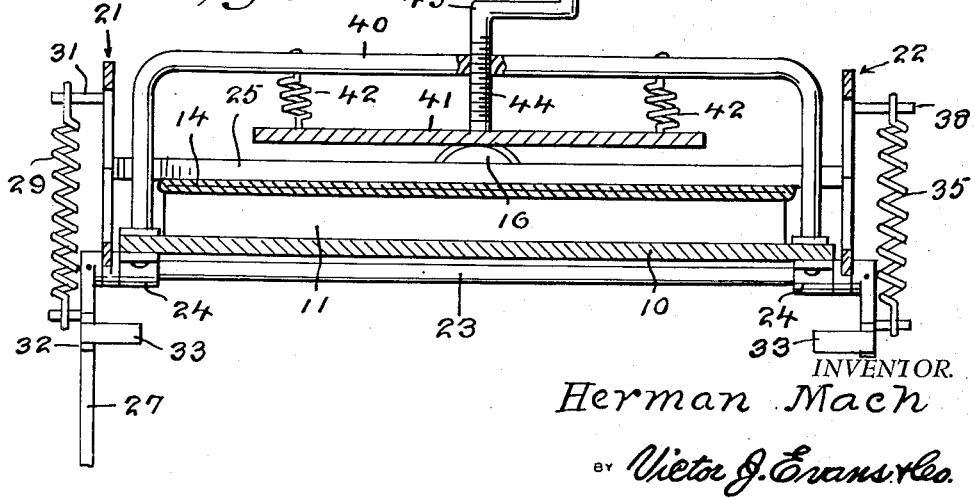

Patented Jan. 26, 1954

2,667,288

UNITED STATES PATENT OFFICE 2,667,288

FLEXIBLE WALLED MEASURING POCKET WITH INLET AND OUTLET CUTOFFS

Herman Mach, Porterville, Calif.

Application September 8, 1949, Serial No. 114,619

9 Claims. (Cl. 222—207)

This invention relates to a dispensing device, and more particularly to a device for dispensing measured amounts of fluid material.

The object of the invention is to provide a device which will enable the user to dispense a predetermined quantity of fluid material, such as fluid cement.

Another object of the invention is to provide a dispensing device which includes a flexible bladder for receiving therein a quantity of fluid material to be dispensed, there being a manually operable means for controlling the flow of material into and out of the bladder.

A further object of the invention is to provide a dispensing device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a front elevational view of the dispenser, according to the present invention;

Figure 2 is a top plan view of the dispensing device;

Figure 3 is a side elevational view of the dispensing device with the bladder in completely collapsed condition;

Figure 4 is a longitudinal vertical sectional view taken through the dispensing device;

Figure 5 is a sectional view taken on the line 5—5 of Figure 1.

Referring in detail to the drawings, the numeral 10 designates a rectangular mounting plate which has a pair of spaced parallel pads 11 and 12 secured thereto, the pads 11 and 12 being preferably fabricated of hard rubber. Extending across the pads 11 and 12 is an open ended flexible bladder 14.

A bracket 13 is secured to the mounting plate 10 by suitable securing elements, such as rivets 15, and the bracket 13 serves to clamp a first conduit 16 to the mounting plate 10. The conduit 16 is adapted to convey fluid material from a source of supply. A clamp 17 serves to maintain the major portion of one end of the bladder 14 closed, and the clamp 17 also serves to connect the conduit 16 to one end of the bladder 14.

A second conduit 18 is connected to the mounting plate 10 by a bracket 13', and the clamp 17 serves to insure a fluid tight connection between the other end of the bladder 14 and the conduit 18. The conduit 18 is adapted to convey the fluid material from the bladder 14 to a desired location.

A means is provided for selectively closing the ends of the bladder 14 so as to control the flow of fluid material into and out of the bladder 14. This means comprises a pair of spaced parallel triangular shaped support members 22 which constitute a part of a body member 19. A rotatable shaft 23 extends along one side of the mounting plate 10, and the shaft 23 is rotatably connected to the mounting plate 10 by a pair of bearing brackets 24. The first arm 25 extends between the support members 21 and 22 and is secured thereto, and a second arm 26 also extends between the triangular shaped support members 21 and 22 and is secured thereto, the arms 25 and 26 being arranged in spaced parallel relation with respect to each other.

Secured to the shaft 23 is a handle 27 which is provided with a plurality of spaced holes 28 therein. A coil spring 29 has one of its ends arranged in engagement with one of the holes 28 and the other end of the coil spring 29 is secured to a bar 30 by a rivet or ear 31, the bar 30 being a part of the support member 21. Secured to the handle 27 or formed integral therewith, is an arcuate member 32 which has a pair of lugs 33 and 34 projecting from opposite ends thereof. The lugs 33 and 34 are adapted to contact the mounting plate 10 so as to limit pivotal movement of the body member 19.

Similarly, a coil spring 35 has one of its ends arranged in engagement with one of the openings 36 in a member 37, the member 37 being connected to the other end of the shaft 23. The other end of the coil spring 35 is connected to an ear 38 which is secured to a bar 39, the bar 39 being part of the support member 22.

For varying the size and capacity of the bladder 14, a U-shaped bracket 40 is provided, and the bracket 40 has its ends secured to the mounting plate 10. A block 41 is arranged adjacent the bladder 14. A pair of coil springs 42 connect the block 41 to the bracket 40, and the coil springs 42 normally urge the block 41 away from the bladder 14. A crank 43 is carried by the bracket 40, and the crank 43 includes a portion 44 which is arranged in threaded engagement with the bracket 40, the crank 43 abutting the block 41.

In use, the mounting plate 10 is placed in a vertically disposed position and fluid material is conveyed from a source of supply, as by gravity, through the conduit 16 to the bladder 14, and at this time the body member 19 is in the position shown in Figure 4. Thus, the arm 26 coacts with the pad 12 to close the outlet end of the bladder 14. Therefore, the fluid material will flow from the conduit 16 into the bladder 14. After the bladder 14 becomes filled with the fluid material, the user grips the handle 27 and pivots the handle 27 slightly in a counter-clockwise direction to thereby move the springs 29 and 35 off center, the off center position of the springs 29 and 35 will snap the body member 19 all the way to the position shown in Figure 3. With the body member in the position shown in Figure 3, the arm 25 is coacting with the pad 11 to close the inlet end of the bladder 14, and at the same time, open the outlet end of the bladder 14. Thus, no more fluid material can enter the bladder 14 through the conduit 16, but all of the fluid material that is in the bladder 14 will flow out by gravity through the conduit 18 to the desired location. Thus, as shown in Fig. 3, the bladder has been completely collapsed such collapsing of the bladder being caused by the fluid being evacuated from the bladder by gravity and the completion of the collapsing thereof by vacuum. Further, a means is provided for adjusting the size and capacity of the bladder 14, the bladder 14 being flexible, so that the amount of material being dispensed can be controlled as desired. This last named means comprises a block 41 which has a crank 43 arranged in engagement therewith. Coil springs 42 normally urge the block 41 away from the bladder 14, and by proper rotation of the crank 43 the block 41 can be moved into engagement with the bladder 14 to cause the size and capacity of the bladder 14 to be varied depending upon the distance the crank 43 is rotated to force the block 41 into engagement with the bladder 14. Thus the compression of the bladder 14 by means of the block 41 can be so controlled as to dispense measured amounts of liquid or fluid material.

From the foregoing, it is apparent that a device has been provided which is especially suitable for dispensing measured amounts of liquid or fluid material. The body member 19 is actuated by means of the handle 27 moving the springs 29 and 35 to an off center position so that the springs 29 and 35 serve to snap the body member all the way to its open and closed position. The device of the present invention is especially useful in connection with a concrete mixer when the mixer is being used on road work, or for paving purposes. The device can be connected to the concrete mixer. Further, the dispenser of the present invention uses no valve whereby leaking will be eliminated, and further, there are no vent or packing nuts which will stick and corrode.

The apparatus of the present invention is especially suitable for measuring and dispensing precise quantities of water and an added air entraining agent, such as burnt oil, to a concrete mixture as the skip is dumped into the mixture and water is added to dry materials. The use of air entraining agents has become popular, but no effective means has been developed for introducing the small quantities required until the apparatus of the present invention was developed. The dispensing device herein described is of extremely simple structure and eliminates the necessity of using ordinary valves, and the dispensing device is highly efficient and requires practically no maintenance.

What I claim:

1. In a dispensing device, a mounting plate, a flexible bladder supported on said plate, a first conduit connected to one end of said bladder for conveying fluid material from a source of supply, a second conduit connected to the other end of said bladder for conveying fluid material to a desired location, means for selectively arranging said bladder in communication with said first and second conduits, manually operable means for varying the size of said bladder, said last named means comprising a U-shaped bracket mounted on said plate and straddling said bladder, a block arranged within said bracket adjacent one side of said bladder for contact therewith, and a crank mounted in said bracket and connected to said block for adjusting the position of said block to compress the bladder to thereby vary the size of said bladder.

2. A dispensing device as in claim 1 wherein a spring device is positioned between said block and said bracket for normally urging said block away from said bladder.

3. In a dispenser, a mounting plate, a pair of spaced parallel resilient pads secured to one side of said plate, an expansible bladder extending across said pads and having its ends opened, a first conduit connected to one end of said bladder for conveying fluid material from a source of supply, a second conduit connected to the other end of said bladder for the egress therethrough of fluid material, a cut-off body member pivotally connected to said mounting plate, said cut-off body member comprising a shaft extending alongside said mounting plate, a triangular shaped support member on each side of said mounting plate and connected to said shaft, a pair of spaced parallel arms extending between said support members and secured thereto, a handle secured to one end of said shaft for pivoting said cut-off body member, a U-shaped frame secured to said mounting plate, a block mounted for movement into and out of engagement with said bladder, and a crank carried by said frame and connected to said block for adjusting the latter.

4. In a dispenser, a mounting plate, a pair of spaced parallel resilient pads secured to one side of said plate, a flexible bladder extending across said pads and having its ends opened, a first conduit connected to one end of said bladder for conveying fluid material from a source of supply, a second conduit connected to the other end of said bladder for the egress therethrough of fluid material, a body member pivotally connected to said mounting plate, said body member comprising a shaft extending alongside said mounting plate, a support member on each side of said mounting plate and connected to said shaft, a pair of spaced parallel arms extending between said support members and secured thereto, a handle secured to one end of said shaft for pivoting said body member, a U-shaped frame secured to said mounting plate, a block mounted for movement into and out of engagement with said bladder, a crank carried by said frame and connected to said block for adjusting the latter, and a spring device for normally urging said block away from said bladder.

5. In a dispensing device, a flexible bladder having an inlet and an outlet and defining a metering chamber, said bladder having backing means at one side thereof, and a double-acting cut-off body member mounted for movement adjacent said tube and shiftable to alternately and simultaneously close off one end of the bladder and free the other end thereof, said cut-off body member having spaced portions movable toward and away from said backing means, and said cut-off body member including a support member for said spaced portions which is tiltable in either direction to alternately engage said backing means with said spaced portions, a shaft for pivotally mounting said support member, a handle pivotally mounted on said shaft for engagement with said support member for limiting pivotal movement of said support member, and a spring device having one end connected to said support member and having its other end connected to said handle, and said spring device being shiftable to either side of said shaft upon movement of said support member whereby said cut-off body member will operate with an over-center snap action.

6. In a measuring dispenser for fluent substances, a flexible liquid-tight tubular bladder having an inlet and an outlet arranged for liquid-tight connection in a liquid line, a bladder backing member at one side of the bladder, a pair of bladder pinching elements mounted adjacent the bladder at the opposite side from the backing member, the bladder pinching elements being movable toward and away from the bladder and its backing member and engageable with the bladder at spaced points to provide a measuring chamber between said points, and a bladder chamber capacity adjusting device mounted adjacent the bladder opposite to said backing member and adjustable independently of the bladder pinching elements and toward and away from the backing member to variably restrict the effective capacity of the chamber, and said bladder pinching elements being pivotally mounted to swing toward and away from the bladder and an over center spring device connected to said pinching elements and operative to alternately swing the pinching elements into pinching engagement with the bladder with a snap action.

7. In a measuring dispenser for fluent substances, a flexible liquid-tight tubular bladder having an inlet and an outlet arranged for liquid-tight connection in a liquid line, a bladder backing member at one side of the bladder, a pair of bladder pinching elements mounted adjacent the bladder at the opposite side from the backing member, the bladder pinching elements being movable toward and away from the bladder and its backing member and engageable with the bladder at spaced points to provide a measuring chamber between said points, a bladder chamber capacity adjusting device mounted adjacent the bladder opposite to said backing member and adjustable independently of the bladder pinching elements and toward and away from the backing member to variably restrict the effective capacity of the chamber, and the bladder chamber capacity adjusting device being located to contact the bladder between the bladder pinching elements.

8. In a measuring dispenser for fluent substances, a flexible liquid-tight tubular bladder having an inlet and an outlet arranged for liquid-tight connection in a liquid line, a bladder backing member at one side of the bladder, a pair of bladder pinching elements mounted adjacent the bladder at the opposite side from the backing member, the bladder pinching elements being movable toward and away from the bladder and its backing member and engageable with the bladder at spaced points to provide a measuring chamber between said points, said bladder pinching elements having a support member which is tiltable in either direction to alternately engage said bladder backing member with said bladder pinching elements, a handle engageable with said support member to limit the movement thereof and resilient means having one end connected to said support member and the other end anchored to said handle, said resilient means being shiftable to either side of said support member upon movement of said support member whereby said support member will operate with an over center snap action, and a bladder chamber capacity adjusting device mounted adjacent the bladder opposite to said backing member and adjustable independently of the bladder pinching elements and toward and away from the backing member to variably restrict the effective capacity of the chamber.

9. In a measuring dispenser for fluent substances, a tubular element defining a measuring chamber and having spaced collapsible portions adjacent the ends thereof, a cut-off assembly including a pair of pinching elements mounted adjacent the tubular element and alternately swingable into and out of engagement with the spaced collapsible portions of the tubular element, and an over center spring device connected to said pinching elements and operative to alternately swing the elements into pinching engagement with the bladder with a snap action, said over center spring device comprising a support member for said pinching elements which is tiltable in either direction and a spring means having one end connected to the support member and the other end anchored to said over center spring device whereby upon movement of said spring means upon movement of said support member will cause the alternate swing of said elements.

HERMAN MACH.

References Cited in the file of this patent

UNITED STATES PATENTS

| Number | Name | Date |
|---|---|---|
| 886,091 | Tainter | Apr. 28, 1908 |
| 1,844,260 | Nicolino | Feb. 9, 1932 |
| 2,129,055 | Gibbs | Sept. 6, 1938 |
| 2,356,212 | Burdett et al. | Aug. 22, 1944 |
| 2,387,923 | McBrien | Oct. 30, 1945 |